United States Patent Office 3,214,672
Patented Oct. 26, 1965

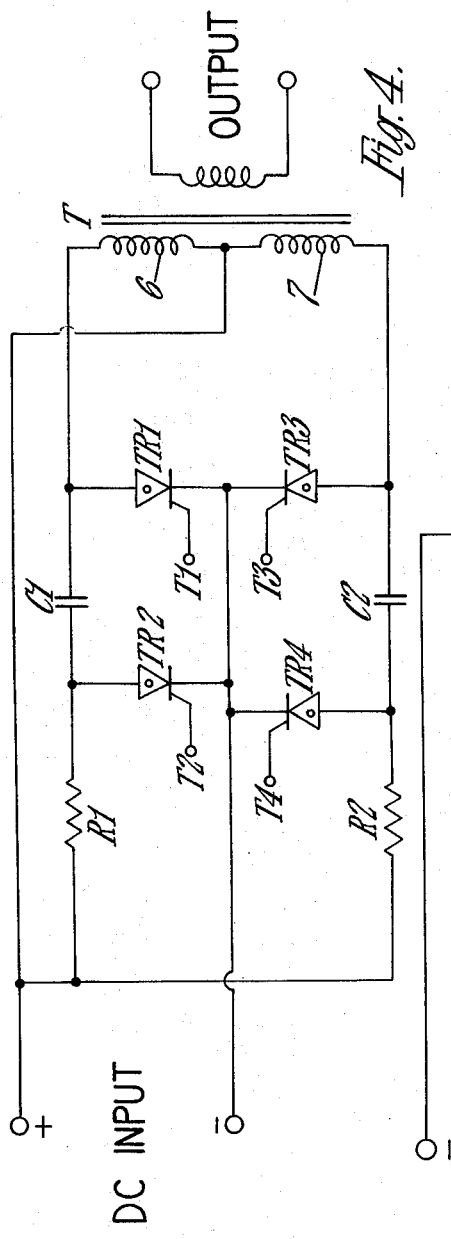
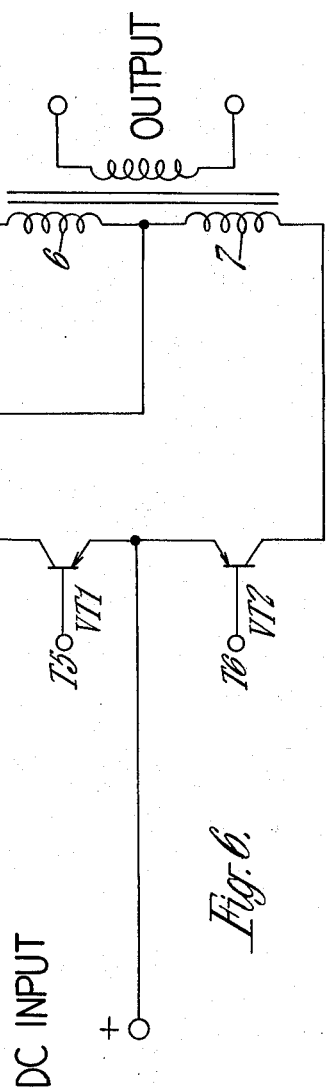
Fig. 4.
Fig. 6.

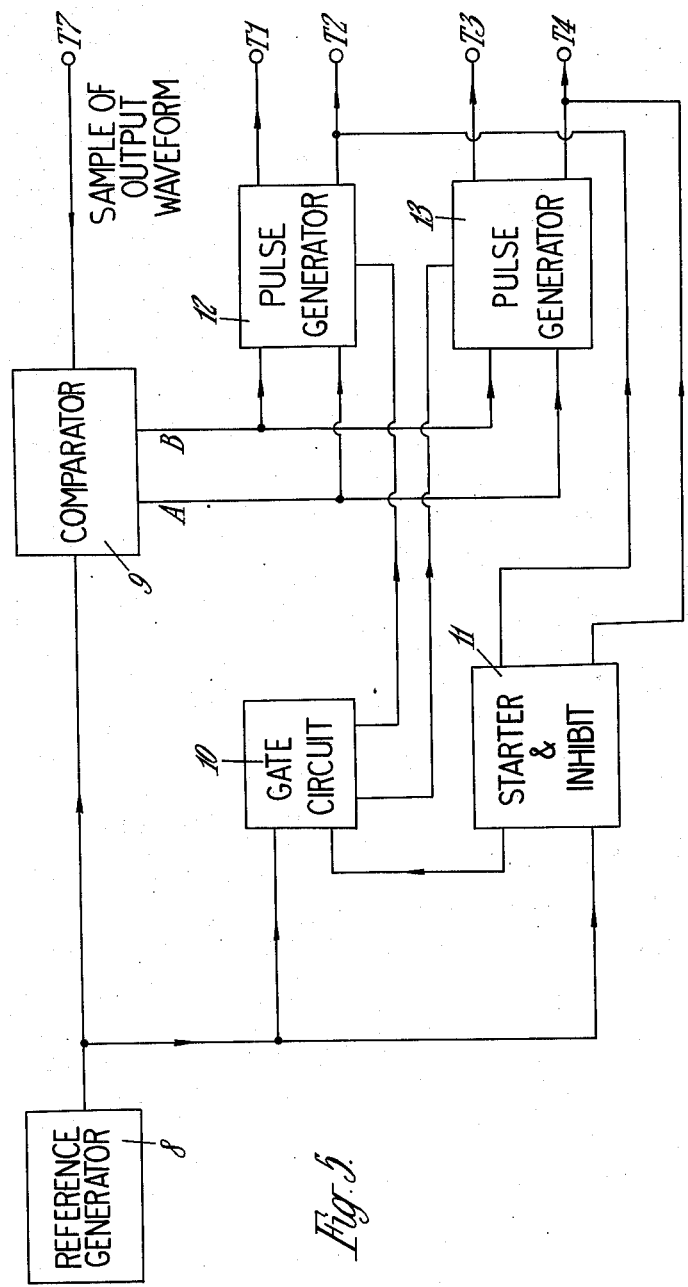

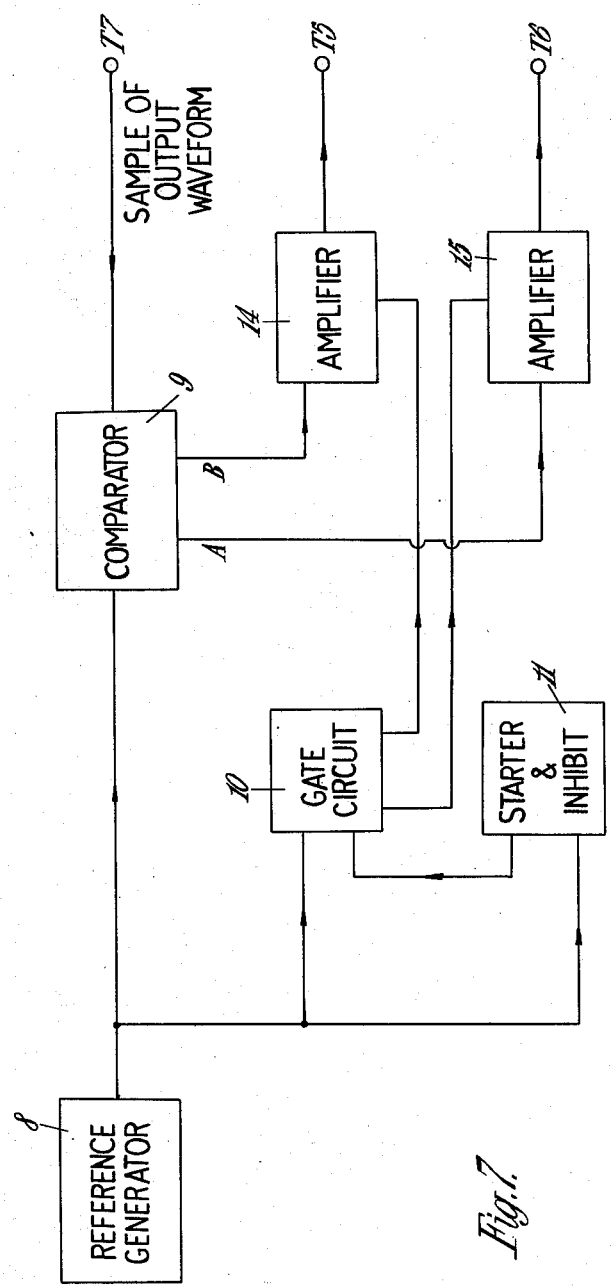

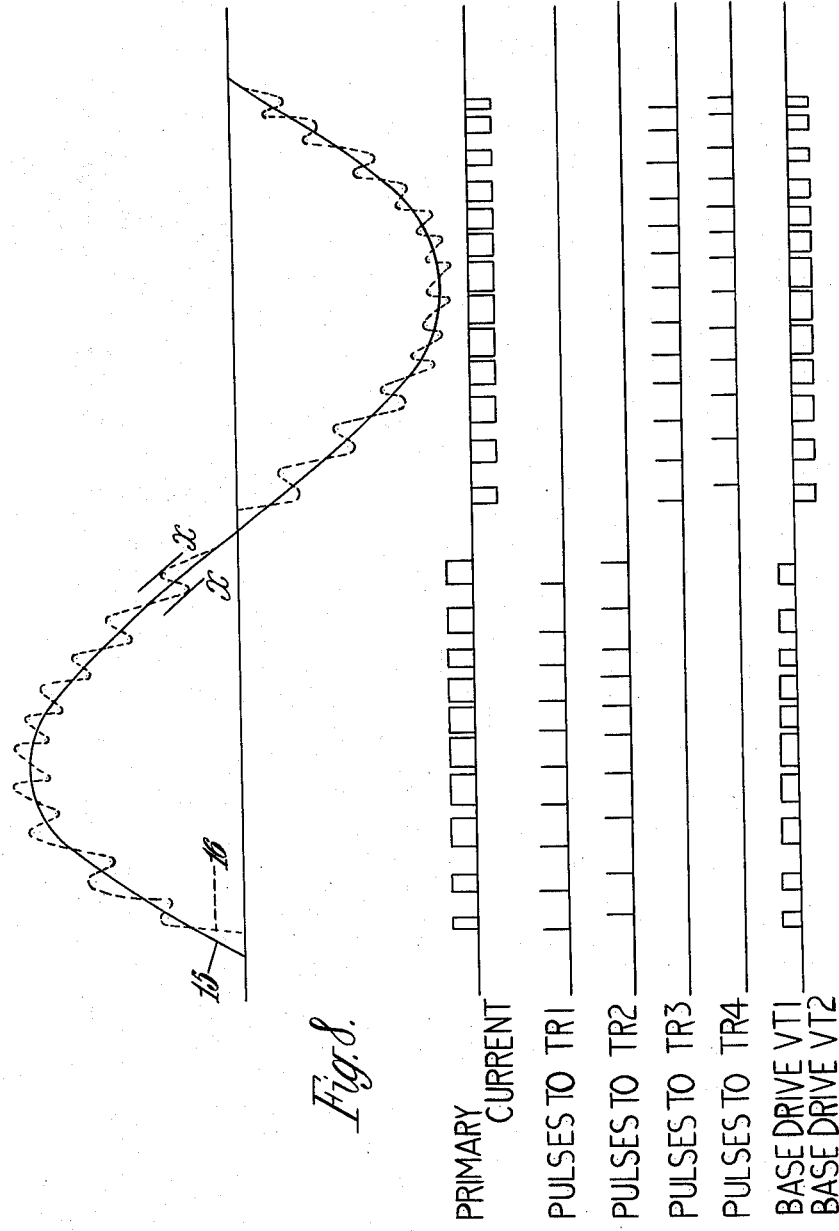

3,214,672
INVERTER SYSTEM
Kenneth Michael Watkins, London, England, assignor to Westinghouse Brake and Signal Company Limited, London, England
Filed Jan. 4, 1962, Ser. No. 164,316
Claims priority, application Great Britain, Jan. 5, 1961, 554/61
5 Claims. (Cl. 321—16)

This invention relates to inverter systems in which the output supply from an inverter to a load is used to control the operation of the inverter.

It is an object of the present invention to provide an improved inverter system of this nature.

The present invention consists in an inverter system in which the output waveform of an inverter is fed to a load, and means are provided for regulating the output waveform in conformity with a reference waveform.

The invention further consists in an inverter system in which the output waveform of an inverter is compared with a reference waveform, and the difference between the two is used to regulate the supply of power to a load.

The invention still further consists in an inverter system as set forth in the preceding paragraph, wherein the output waveform is fed into a controller where it is compared with the reference waveform. The controller is arranged so that the supply of power to the load is switched off when the output waveform exceeds the reference waveform, and switched on when it is less than the reference waveform. In this way, an output waveform is produced which follows very closely the reference waveform. Variations in input voltage or load, either of a long term or cyclic nature, are automatically compensated.

Figure 1:
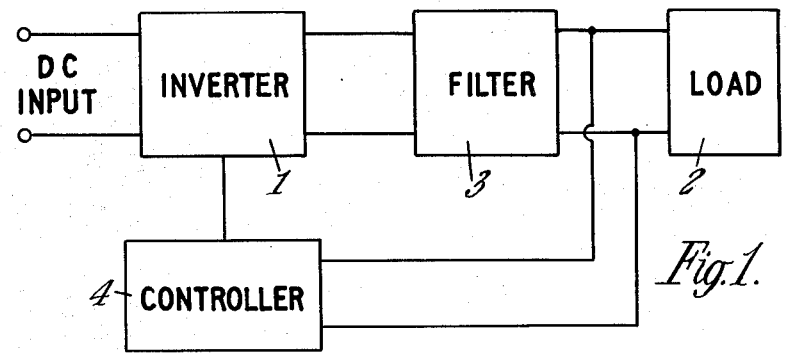
Figure 2:
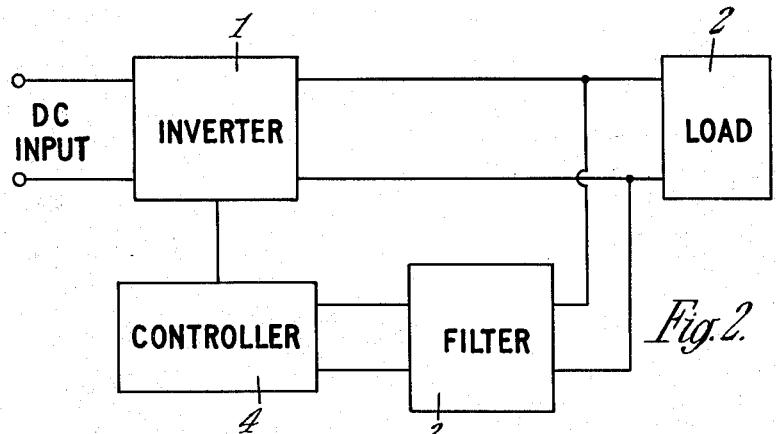
Figure 3:
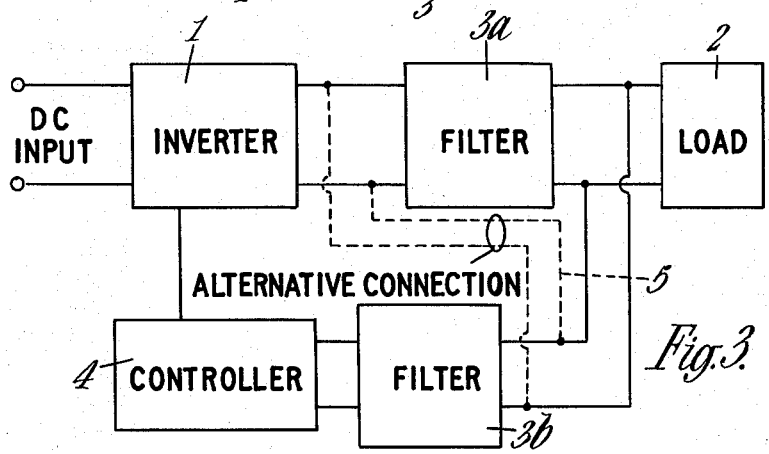

In the accompanying drawings:

FIGURE 1 shows diagrammatically an inverter system according to the present invention, FIGURES 2 and 3 are similar to FIGURE 1 and show alternative systems according to the present invention, FIGURE 4 shows diagrammatically an inverter employing controllable semi-conductor rectifiers which may be used in the systems of FIGURES 1, 2 and 3, FIGURE 5 shows diagrammatically a controller for use with the inverter of FIGURE 4, FIGURE 6 shows diagrammatically an inverter employing transistors which may be used in the systems of FIGURES 1, 2 and 3, FIGURE 7 shows diagrammatically a controller for use with the inverter of FIGURE 6, and FIGURE 8 shows various waveforms associated with the controllers of FIGURES 5 and 7.

In carrying the invention into effect according to one convenient mode by way of example, FIGURE 1 shows an inverter system in which an inverter 1 is fed with a direct current input and delivers an alternating current output to a load 2. A filter 3 is interposed between the inverter output and the load 2, and a portion of the output after passing through the filter 3 is fed to a controller 4 which, in turn, controls the operation of the inverter 1.

In an alternative arrangement shown in FIGURE 2, the filter 3 is connected so as to pass only that portion of the inverter output which is fed to the controller 4 and not the portion fed to the load 2.

FIGURE 3 shows a further alternative arrangement in which two filters 3a and 3b are used to provide a combination of FIGURES 1 and 2. Dotted lines 5 indicate an alternative connection to the filter 3b if it is desired that the signal fed to filter 3b shall not pass through filter 3a.

The filters 3, 3a, and 3b are provided in order to remove high frequency components due to switching. The rise and fall time of the output waves are determined by the combination of the filter(s) and the load, and different filters may be required for the controller and the load in some applications.

In FIGURE 4 is shown, in more detail, an inverter 1 which may be used in any of the systems shown in FIGURES 1 to 3. This inverter 1 includes four controllable semi-conductor rectifiers TR1, TR2, TR3 and TR4 connected two to each half 6, 7, of the primary winding of an output transformer T.

The rectifiers TR1, TR2, TR3 and TR4, are fired by pulses at terminals T1, T2, T3 and T4 from a controller 4 shown in detail in FIGURE 5.

The controller includes a reference waveform generator 8 which is designed to generate a reference waveform which is of the same form as the desired output from the inverter. The reference waveform is fed to a comparator 9, a gate circuit 10 and a starting and inhibiting circuit 11.

The reference waveform from the generator 8 is compared with the output waveform from the inverter applied to terminal T7, by means of the comparator 9 which can produce outputs on leads A and B. Pulses are produced on lead A when the reference voltage is higher than the output voltage, and on lead B when the output voltage is the higher one. Both leads A and B are connected to a pulse generator 12 having output terminals T1 and T2, and to a pulse generator having output terminals T3 and T4.

The pulse generators 12 and 13 are also controlled by the gate circuit 10 which is arranged to switch on the appropriate pulse generator in each half-cycle to provide a short output pulse (10 micro-secs.) to fire the appropriate rectifier depending upon whether the pulse from the comparator 9 is on lead A or lead B.

The starting and inhibiting circuit 11 is connected to the gate circuit 10 and to terminals T2 and T4. The reference waveform from generator 8 is sampled, and a pulse output is obtained at the end of each half-cycle which is used to switch off the pulse generators via the gate circuit 10, and to switch ON either TR2 or TR4 depending on the half cycle. This ensures that TR1 and TR3 are always switched off at the end of each half cycle.

The inverter (FIGURE 4) and controller (FIGURE 5) are arranged so that when the output voltage from the inverter 1 is lower than the reference wave from generator 8, then rectifier TR1 will be fired ON. Power will then flow into the output transformer T until such time as the output voltage is higher than the reference voltage whereupon rectifier TR2 will be fired and will switch off rectifier TR1 through capacitor C1.

When the output voltage falls below the reference voltage, rectifier TR1 will again be fired ON and load power will again flow, rectifier TR2 being switched off by rectifier TR1 through capacitor C1.

On the other half cycle rectifiers TR3 and TR4 will function in a similar manner.

With this arrangement, the output voltage will thus be switched off rapidly when it exceeds the reference voltage, and the power delivered to the load 2 will thus be of a form similar to the generated waveform.

FIGURES 6 and 7 show alternative forms of inverter and controller when it is desired to use transistors in place of controllable semi-conductor rectifiers.

In the inverter shown in FIGURE 6, two switching transistors VT1 and VT2 are arranged to pass load current alternately into the two halves 6, 7, of the primary winding of output transformer T in alternate half cycles of the inverter output frequency.

During one half cycle, transistor VT1 is arranged to be switched ON at instants when the output voltage is lower than the reference voltage, and OFF at instants when the output voltage rises above the reference voltage (allowing for small discrepancies due to loop gain)

by means of an input to terminal T5 to the base of transistor VT1. During the next half cycle transistor VT2 will be switched ON and OFF governed by the input to T6 to the base of transistor VT2.

The controller shown in FIGURE 7 is generally similar to that shown in FIGURE 5, but is of somewhat simpler construction since pulses on only one output are required in each half cycle instead of two, i.e. either a pulse on lead A or lead B, due to the fact that each transistor may be rendered conducting merely by adjustment of the input to its base whereas in the previous embodiment each controllable semi-conductor rectifier has to be switched off by switching on its associated commutating rectifier. The pulse generators are replaced by amplifiers 14 and 15 arranged to amplify pulses on the leads A and B of the comparator 9 for controlling the transistors in the desired manner.

The various waveforms of these systems are shown in FIGURE 8 in which 15 represents the reference waveform and 16 the output waveform. The limits $x$ of departure of the output waveform from the reference will depend upon the sensitivity of the comparator and the time constant of the filter.

The circuits described above may be arranged to afford the following advantages:

(i) The output waveform approximates very closely to the reference waveform so that the value of the filter is not as critical as in a conventional inverter. Furthermore, since the main frequency components which require filtering are of a high frequency nature in relation to the fundamental, the necessary filters need not be bulky or expensive.

(ii) Any desired output waveform can be applied to the load, as long as it can be generated by the reference generator 8.

(iii) The system is a fully closed loop and thus automatic regulation of the output voltage (or current) is readily obtained.

(iv) Dips and peaks on the output waveform, for example due to the sudden application of a load, tend to be eliminated.

(v) The system is particularly suitable for low frequency application (say 100 c./s. or less) due to (i) above, and a low frequency system should be considerably smaller and lighter than a conventional inverter.

It will be appreciated that due to the ability of the systems described above to follow the reference waveform, the system may also be used as a very high power amplifier for low frequency applications, although it is not expected that this would work above, say, 1 kc./s.

For use as an amplifier, the reference generator 8 would be replaced by the input signal to be emplified.

Various modifications may be made within the scope of the present invention.

I claim:

1. An inverter circuit arrangement which includes a direct current supply, an output terminal, at least two controllable rectifier devices for connecting the supply to the output terminals, one during positive half cycles and the other during negative half cycles, a reference voltage waveform generator, means for comparing the reference voltage waveform with the voltage at the output terminals, means for rendering the respective rectifier device non-conducting when the output voltage exceeds the reference voltage by a predetermined amount, and means for rendering the respective rectifier device conducting when the output voltage is less than the reference voltage by a predetermined amount.

2. An inverter circuit arrangement which includes a direct current supply, output terminals, at least two controllable rectifier devices operable alternatively to connect the direct current supply to the output terminals during positive and negative half cycles respectively, a reference voltage waveform generator, means for comparing the reference voltage waveform with the output voltage, and means for rendering the respective rectifier device non-conducting when the output voltage exceeds the reference voltage by a predetermined amount and conducting when the output voltage is less than the reference voltage by a predetermined amount.

3. An inverter circuit arrangement which includes a direct current supply, output terminals, at least two controllable rectifier devices for alternately connecting the supply to the output terminals during alternate positive and negative half cycles, a reference voltage waveform generator, means for comparing the reference voltage waveform with said output voltage, an additional controllable rectifier device associated with each controllable rectifier device, a capacitor connecting each rectifier device with its associated additional rectifier device, means for rendering the respective additional rectifier device conducting and thus rendering the associated rectifier device non-conducting when the output voltage exceeds the reference voltage waveform by a predetermined amount, and means for rendering the respective rectifier device conducting when the output voltage is less than the reference waveform voltage by a predetermined amount.

4. An inverter circuit arrangement which includes a direct current supply, output terminals, at least two controllable rectifier devices for connecting the supply to the output terminals during positive and negative half cycles respectively, an additional controllable rectifier device associated with each of said rectifier devices, a capacitor connecting each rectifier device to its associated rectifier device, a reference generator for supplying a reference voltage waveform, pulse generators for producing pulses for rendering said rectifier devices and said additional rectifier devices conducting and a comparator for comparing said reference voltage waveform with the output voltage and for controlling said pulse generators, whereby when the output voltage exceeds the reference voltage waveform by a predetermined amount the respective additional rectifier device is rendered conducting and thus the associated rectifier device is rendered non-conducting and when the output voltage is less than the reference voltage waveform by a predetermined amount the respective rectifier device is rendered conducting.

5. An inverter circuit arrangement which includes a direct current supply, a transformer having an output winding and a primary winding including two winding halves, a first controllable rectifier device for connecting the direct current supply to one primary winding half during first half cycles, a second controllable rectifier device for connecting the direct current supply to the other winding half with reversed polarity during second half cycles, a reference waveform generator, means for comparing the reference voltage waveform with the output voltage of said output winding, means for rendering said first and second rectifier devices non-conducting during first and second half cycles respectively at instants when the output voltage exceeds the reference voltage by a predetermined amount, and means for rendering said first and second rectifier devices conducting during first and second half cycles respectively when the output voltage is less than the reference voltage by a predetermined amount.

References Cited by the Examiner

UNITED STATES PATENTS

| | | | |
|---|---|---|---|
| 1,997,644 | 4/35 | Long | 321—6 X |
| 2,959,725 | 11/60 | Younkin | 321—45 X |
| 3,027,508 | 3/62 | Johnson | 321—45 X |
| 3,170,107 | 2/65 | Jessee | 321—69 X |

LLOYD McCOLLUM, *Primary Examiner.*